United States Patent [19]
Han

[11] Patent Number: 5,975,350
[45] Date of Patent: Nov. 2, 1999

[54] SCREW FEEDING APPARATUS

[76] Inventor: Ki Su Han, 2249 Lerona Ave., Rowland Heights, Calif. 91748

[21] Appl. No.: 08/879,295

[22] Filed: Jun. 19, 1997

[51] Int. Cl.⁶ ............... B65H 1/08; B65G 59/00; B25C 5/02

[52] U.S. Cl. ............ 221/232; 221/231; 221/268; 227/120

[58] Field of Search .................. 221/232, 231, 221/268; 227/120

[56] References Cited

U.S. PATENT DOCUMENTS

| | | | |
|---|---|---|---|
| 3,991,925 | 11/1976 | Buchel | 227/200 |
| 4,416,172 | 11/1983 | Medinger | 221/190 |
| 4,624,401 | 11/1986 | Gassner et al. | 227/120 |
| 4,625,597 | 12/1986 | Cast | 227/120 |
| 4,778,094 | 10/1988 | Fishback | 227/120 |
| 4,784,306 | 11/1988 | Baum | 227/120 |
| 4,834,342 | 5/1989 | Padgett | 227/120 |
| 4,860,937 | 8/1989 | Arnold | 227/120 |
| 5,337,636 | 8/1994 | Shea | 221/220 |
| 5,425,473 | 6/1995 | Kvalheim | 221/188 |
| 5,473,965 | 12/1995 | Chen | 81/434 |
| 5,653,371 | 8/1997 | Hou | 227/109 |

Primary Examiner—William E. Terrell
Assistant Examiner—Wonki K. Park

[57] ABSTRACT

A screw feeding apparatus, which is designed for use with power tools, has a casing for holding screws, a platform slidably disposed in the casing for supporting and advancing the screw, a chamber assembly and a clamp assembly. In particular, the chamber assembly has an elongated cylinder for guiding the screw into a work surface. The clamp assembly is situated in the chamber assembly so that each screw from the casing is properly positioned for engaging a screwdriver bit. The screw feeding apparatus also includes a loading sleeve coupled to a rear cylinder mounted on the rear end of the chamber assembly. When the loading sleeve is retracted with respect to the rear cylinder, a screw is loaded into the chamber assembly.

18 Claims, 12 Drawing Sheets

SCREW FEEDING APPARATUS

BACKGROUND OF THE INVENTION

1. Field of the Invention

This invention relates to a power screwdriver, and more particularly, to an automatic screw feeding apparatus for use with a power screwdriver.

2. Description of Related Art

Various types of power screwdrivers have been developed to increase work productivity. They come in various sizes and styles, but with one thing in common. That is, almost all of them require an operator to manually hold a screw when using the power screwdriver. The inconvenience of holding each screw is compounded since the work productivity is limited by how fast screws are provided to the power screwdriver.

Although there are some screw feeding mechanisms for use with the power tools, most of them are large and cumbersome to use. Moreover, many internal components render these feeding mechanisms difficult to troubleshoot and maintain. Alternatively, some automatic screw feeding mechanisms require specially designed screw ribbons, where screws are queued in a single line, and thus cannot be used with ordinary individual screws. This is especially cumbersome since the screw ribbons may not be always available and the ribbons may rip when used in a heavy industrial environment.

SUMMARY OF THE DISCLOSURE

It is an object of the present invention to provide a screw feeding apparatus which is compact in design to include screws in the casing, easy to use and can be easily assembled and disassembled to facilitate maintenance.

According to a first embodiment of the present invention, the screw feeding apparatus includes a casing for holding screws, a platform slidably disposed in the casing for supporting the screws, a chamber assembly removably coupled to the casing. The screw feeding apparatus further includes a cylinder assembly mounted to the chamber assembly. The cylinder assembly has first and second cylinders and is used for guiding screws from the casing to a work surface. A coil is coupled to the platform for biasing the platform toward the chamber assembly to advance the screws from the casing into the chamber assembly. Clamps, which are fastened to the chamber assembly, are used to firmly hold a screw in the chamber assembly. The clamps may be magnetized to enhance holding strength. For loading a screw into the chamber assembly, a loading sleeve is slidably disposed on the elongated cylinder to maintain at least one of first and second positions with respect to the elongated cylinder. A screw from the casing is loaded in the chamber assembly when the loading sleeve is in the second position (i.e., a retracted position).

In the first embodiment, the casing comprises a clip and a clip cover slidably coupled to the clip, so that when the clip cover slides open, an internal chamber of the clip is exposed for loading screws.

As part of the spring loading mechanism, a spring and a screw actuator are disposed on the chamber assembly. The screw actuator is coupled to the spring and engages the head of a screw. The spring is coupled to the loading sleeve with a pair of strips or wires for advancing the screw in respond to the movement of the loading sleeve with respect to the second cylinder of the cylinder assembly.

To bias the platform disposed in the casing toward the chamber assembly, a first end of the coil is secured to a lower end of the clip and a second end of the coil is coupled to the platform through rollers rotatably mounted on the upper end of the clip.

According to a second embodiment of the present invention, the screw feeding apparatus includes a clip for holding screws, a clip cover pivotally coupled to the clip, a platform slidably disposed in the casing for supporting the screws, and a chamber assembly secured to the casing. The clip cover includes a partition longitudinally coupled to the clip cover with a plurality of coils in between. The partition abuts against the screws when the clip cover is closed with respect to the clip. The chamber assembly includes an elongated cylinder assembly for guiding a screw to a work surface with the screwdriver bit slidably placed in the elongated cylinder. In the second embodiment, a spring is coupled to the platform for biasing the platform to advance the screws into the chamber assembly.

Clamps, which are fastened to the chamber assembly, are used to firmly hold a screw. Preferably, two side clamps are secured to the sides of the chamber assembly and one top clamp is secured to the top of the chamber assembly. A loading sleeve is slidably disposed in the elongated cylinder assembly to maintain at least one of first and second positions with respect to the elongated cylinder assembly. A screw from the clip is loaded in the chamber assembly when the loading sleeve is in the second position and is prevented from loaded in the chamber assembly when the loading sleeve is in the first position by blocking a loading path to the chamber assembly.

The loading sleeve, which is slidably disposed in the elongated cylinder assembly, has legs on one end for adjacently fitting the clamps when the loading sleeve is in the first position to prevent the screws in the clip to advance into the chamber. The loading sleeve further has a rail on the outer surface and a matching groove formed on the inner surface of the elongated cylinder to prevent the loading sleeve from rotating.

These and other aspects, features and advantages of the present invention will be better understood by studying the detailed description in conjunction with the drawings and the accompanying claims.

BRIEF DESCRIPTION OF THE DRAWINGS

A detailed description of embodiments of the invention will be made with reference to the accompanying drawings, wherein like numerals designate corresponding parts in the several figures.

DETAILED DESCRIPTION OF THE PREFERRED EMBODIMENTS

Figure 1:
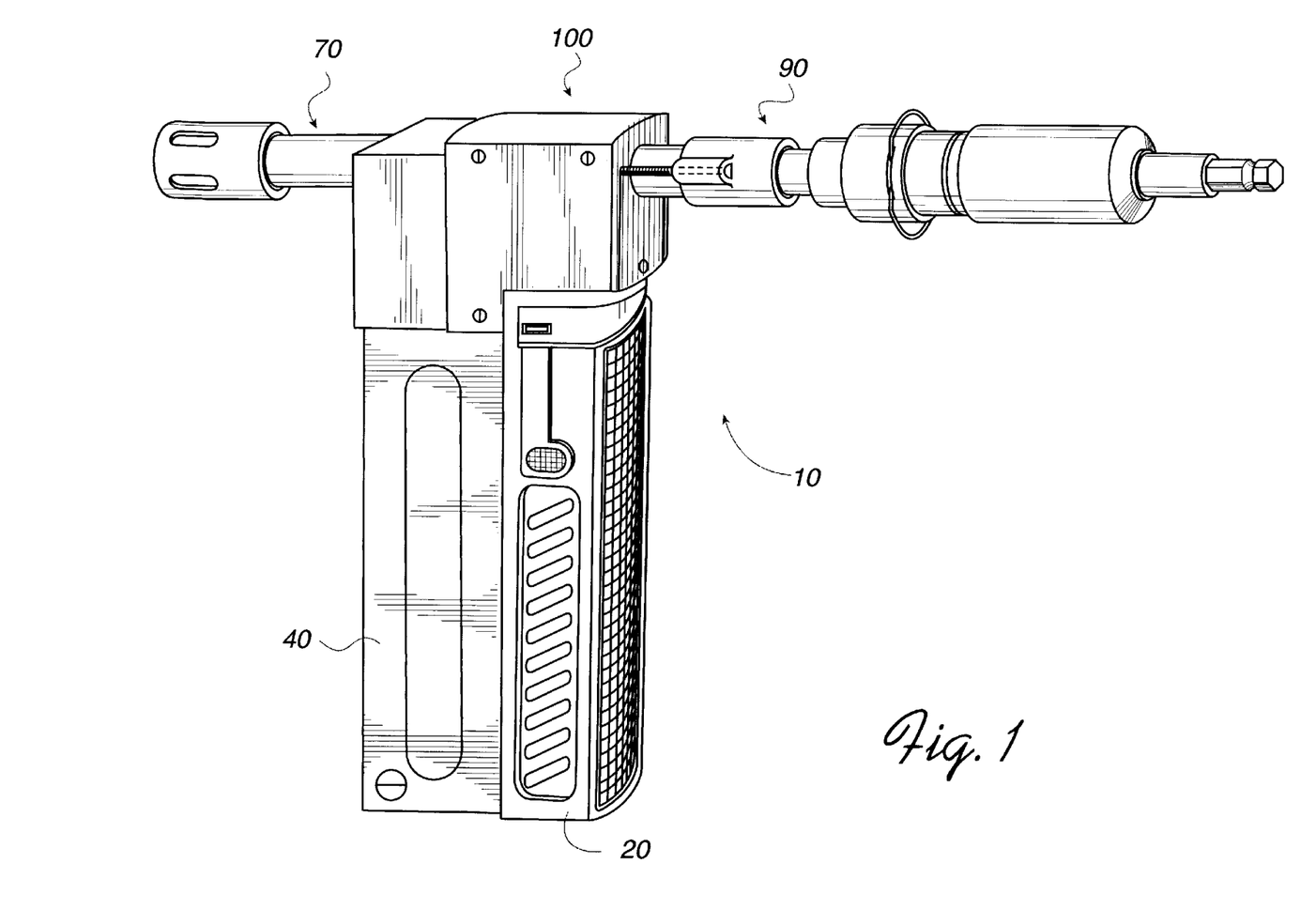
FIG. 1 is a perspective view of a first embodiment of the present invention.

Various embodiments of the screw feeding apparatus are shown in the drawings for purposes of illustration. The screw feeding apparatus according to the present invention is designed to be used with power tools, but may be modified to be used with hand tools, such as conventional screwdrivers. FIGS. 1–6 illustrate a first embodiment of the screw feeding apparatus 10. In particular, FIG. 1 illustrates a perspective view of the screw feeding apparatus 10 which is preferably used with a screwdriver described in U.S. patent application Ser. No. 08/832,806 filed on Apr. 4, 1997. The screw feeding apparatus 10 includes a casing 40 (or a magazine) for holding screws, a chamber assembly 100 for releasably holding a screw in a cylinder assembly 70 and a loading sleeve 90 for advancing and loading a screw into the cylinder 70.

Figure 2:
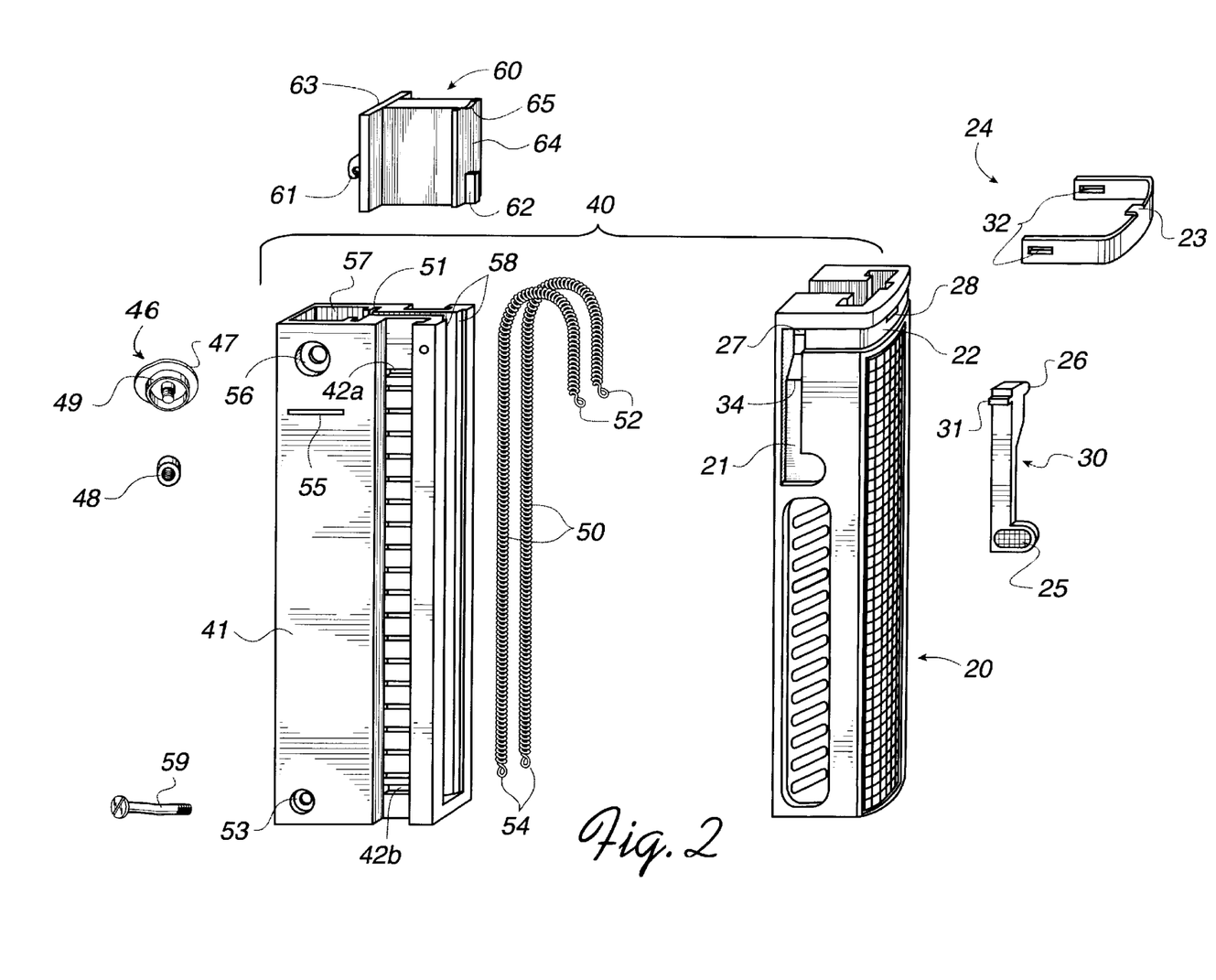
FIG. 2 is a partly exploded view of a casing of FIG. 1.

A partly expanded view of the casing 40 of FIG. 1 is illustrated in FIG. 2. The casing 40 includes a clip 41, which holds a stack of screws, and a clip cover 20 which is slidably attached to the clip 41. The clip 41 has an elongated rectangular shape with a hollow chamber 57 extending along the length of the clip 41. A front side of the clip 41 is open so that the chamber 57 is exposed from the front. On the front side of the clip 41, there are provided are a pair of rails 58 for vertically guiding a platform 60. Preferably, the rails 58 vertically extend the length of the clip 41. The cross-section of the chamber 57 is configured to receive the platform 60. On the left and right sides of the clip 41, there are two holes 56 (only one is shown in FIG. 2). Each hole 56 is used for rotatably mounting a roller 46. Each roller 46 has a guide plate 47, an inner cylinder 49 which has a smaller diameter than the guide plate 47, and a center bolt which is inserted into the hole 56 to mate with a matching nut 48. The roller 46 is mounted on the inside wall of the clip 41 so that the matching nut 48 engages the center bolt from the outside. Once the roller 46 and the nut 48 are securely mounted, the roller 46 rotates about its center.

Figure 3:
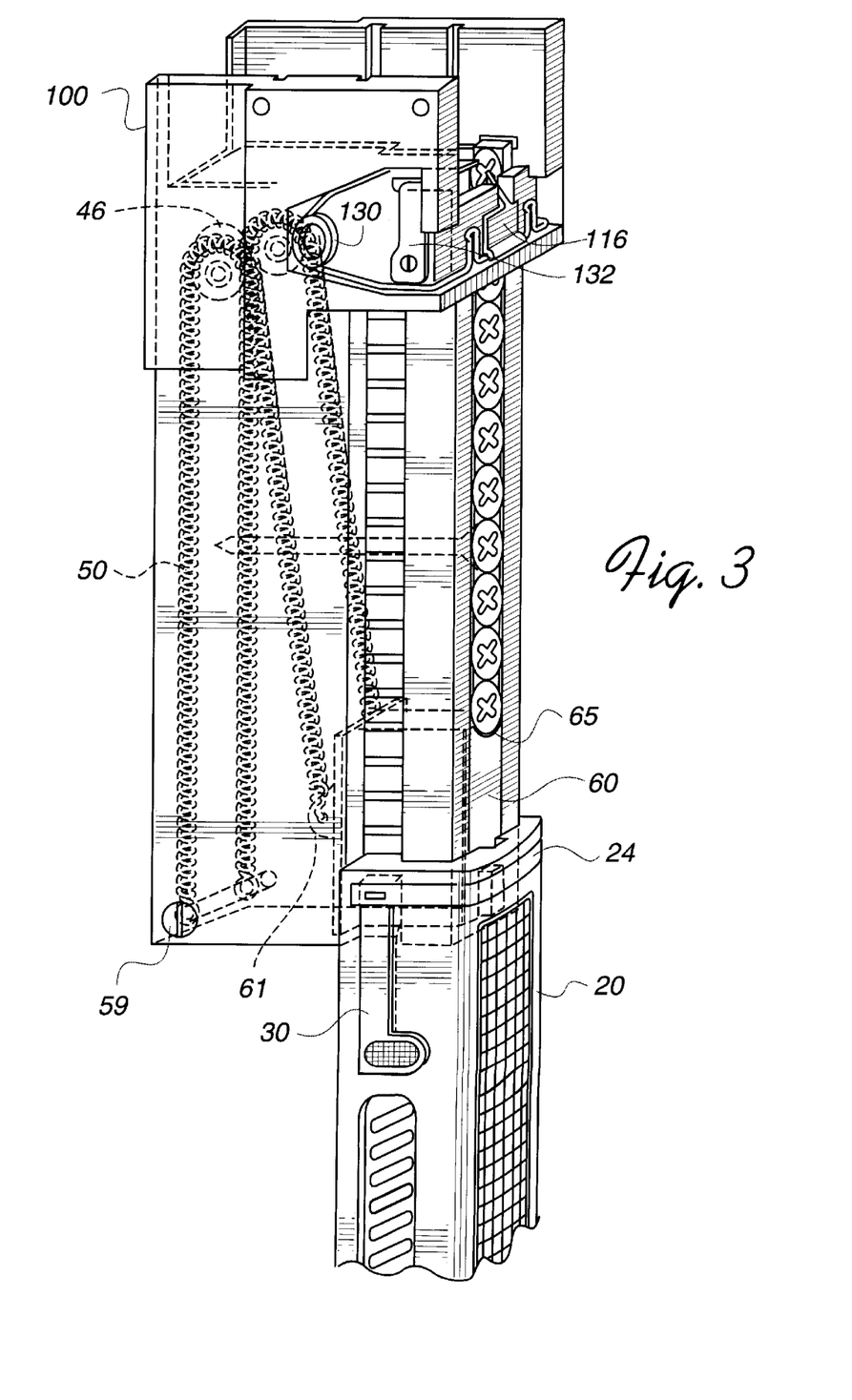
FIG. 3 is an inner view illustrating the assembled first embodiment shown in FIG. 1.

The platform 60 preferably has a first shoulder 63 and a second shoulder 64 positioned substantially opposite of and parallel to each other. The first shoulder 63 is slidably inserted into a guide slit 51 longitudinally formed inside the clip 41. The second shoulder 64 abuts against the pair of rails 58. It is preferable that the second shoulder 64 is smaller in width. The widths of both shoulders 63 and 64 are preferably slightly smaller than the inner width of the chamber to allow the platform 60 to vertically move in the casing 40. In a preferred embodiment, the top portion of the second shoulder 64 has an indent 65 which has a substantially semi-circular shape. The indent 65 supports the head portion of the screws stacked in the chamber 57 of the clip 41, as illustrated in FIG. 3. The platform 60 also has a protrusion 62 extending from the second shoulder 64. The protrusion 62 is engaged by and moves with clip cover 20 to slide to the bottom of the clip 41 for loading screws in the chamber 57.

The platform 60 also has a pair of hooks 61 (only one hook is shown in FIG. 2) on the opposite side of the protrusion 62 and extending from the first shoulder 63. The hooks 61 are preferably positioned adjacent to each other for engaging the coils 50.

Also shown on FIG. 2 is a clip cover 20 for use with the clip 41. Similar to the clip 41, the clip cover 20 has a shape of an elongated rectangular cylinder with an elongated groove 29 formed along the longitudinal interior of the clip cover 20. The groove 29 is formed of a substantially T-shape and is configured to match the corresponding grooves formed in the clip 41. Near the top of the clip cover 20, there is a C-shaped receptacle 22 formed around the outer circumference of the clip cover 20. The receptacle 22 is configured to receive a matching C-shaped bracket 24. The receptacle 22 has a slit 28 for receiving a matching flange 23 formed on the C-shaped bracket 24, as shown in FIG. 2.

The clip cover 20 also has a pair of holders 21 formed on the opposite outer walls. Each holder 21 is configured to receive a similarly shaped engaging member 30. Preferably, the holder 21 has a slightly inclined surface such that the highest point 34 is used as a pivoting point for the engaging member 30. The engaging member 30 preferably has an extension 26 which is sufficiently long to extend through a hole 27 formed in the top portion of each holder 21 to engage an upper receptor 42a when the clip cover 20 is in the closed position with respect to the clip 41. The engaging member 30 also has a press region 25 formed at the opposite end of the extension 26. When the press region 25 is depressed, the engaging member 30 tilts in the direction of the pressure. As a result, the extension 26, which engages the upper 42a or lower receptor 42b is withdrawn, thus allowing the clip cover 20 to slide with respect to the clip 41. The engaging members 30 are held in place in the respective holder 21 when the apertures 32 of the C-shaped bracket 24 engage the tip 31 of the engaging member 30.

The assembly of the casing 40 will now be described in reference to FIG. 3. After the platform 60 is disposed inside the chamber 57, each hook 61 of the platform 60 is connected to a first end 52 of coil 50. The coil 50 is then wrapped around the inner cylinder 49 of the roller 46. A second end 54 of the coil 52 is coupled to the bottom of the clip 41 by a bolt 59 and a matching nut (not shown) which extends from one wall to the other wall of the clip 41 through a hole 53. Alternatively, other suitable ways to secure the second end 54 of the coil 50 may be used.

Once the platform 60 is installed, the clip cover 20 is slid onto the clip 41. Two engaging members 30 are each placed in the respective holders 21 so that the extension 26 of the engaging member 30 is coupled to either one of the upper receptor 42a or lower receptor 42b. The flange 23 of the bracket 24 is inserted into the slit 28 and rests on the top surface of the protrusion 62 of the platform 60. As a result, the downward movement of the clip cover 20, forces the platform 60 to move with the clip cover 20, since the protrusion 62 is in contact with the flange 23. The vertical sliding movement of the platform 60 is biased, preferably, toward the chamber assembly 100 by the coil 50 wrapped around the roller 46. To load screws, the clip cover 20 is lowered so that the flange 23 engages the lower receptor 42b. After screws are loaded in the clip 41, the press region 25 is depressed, allowing the clip cover 20 to move toward the chamber assembly 100. When the clip cover 20 is fully closed with respect to the clip 41, the protrusion 26 engages the upper receptor 42a.

Figure 4:
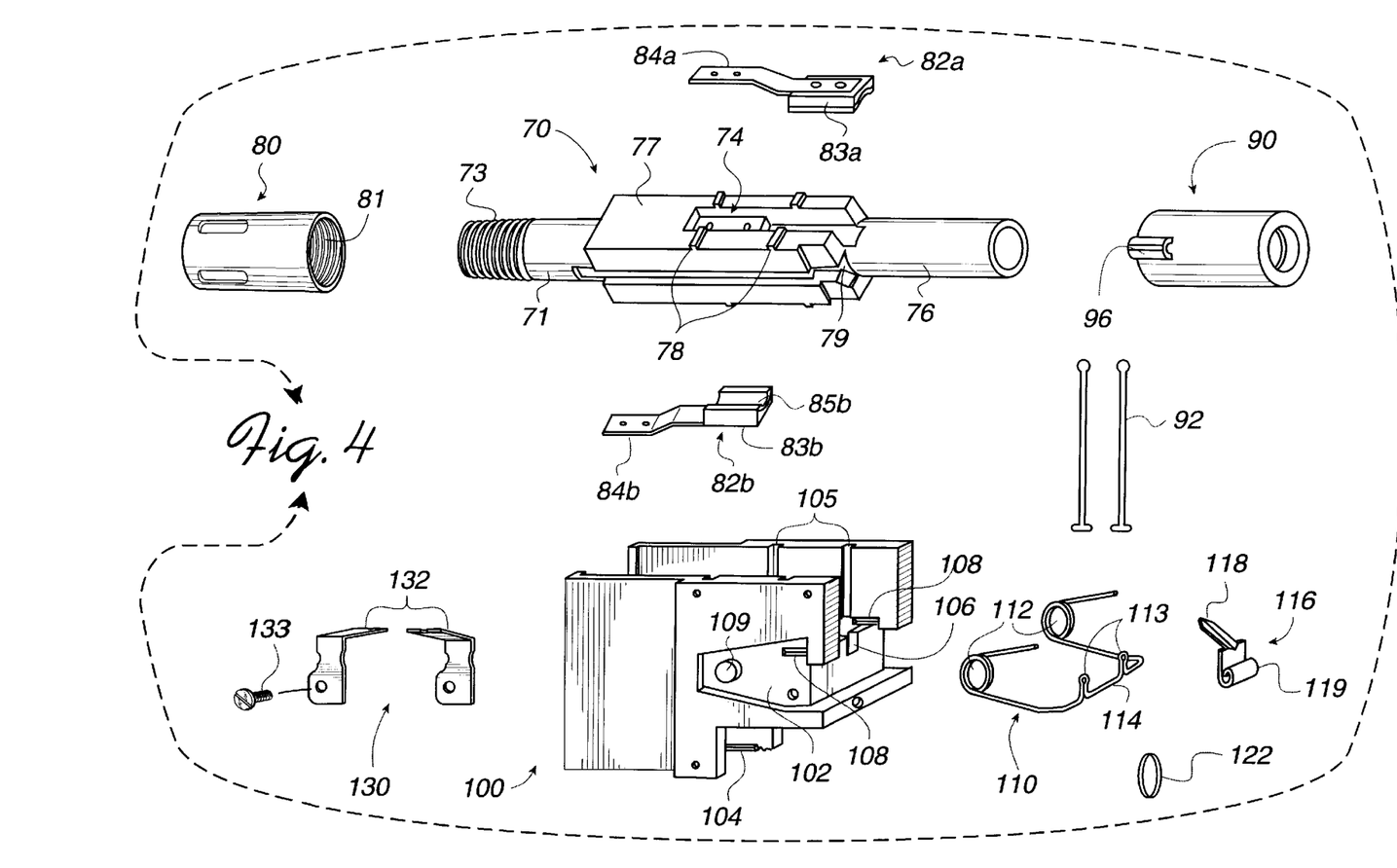
FIG. 4 is an exploded view of chamber and cylinder assemblies of FIG. 1.

FIG. 4 is an exploded view of the chamber 100 and the cylinder 70 assemblies according to the first embodiment of the present invention. The cylinder assembly 70 includes an elongated cylinder 71 having a threaded first end 73 and a second end 76. The inner diameter of the cylinder 71 is sufficiently large to accommodate a screwdriver bit 130 shown in FIG. 6. A first sleeve 80 has a matching inner thread 81 for adjustably securing onto the first end 73 of the cylinder. The penetration depth of a screw from the screw feeding apparatus 10 can be controlled by adjusting the position of the first sleeve 80 with respect to the threaded first end 73.

In the middle portion of the cylinder 71, there is a clamp casing 77 for mounting a clamping assembly comprising a matching pair of clamps 82*a* and 82*b*, as shown in FIG. 4. The clamp casing 77 is substantially rectangular in shape and has rails 78 on opposite side of the rectangular walls for sliding into the matching tracks 105 formed in the chamber assembly 100. The clamp casing 77 also has a pair of clamp receptors 74 on the opposite side of each other. Each clamp receptor 74 is configured to receive the clamp 82*a*. The clamp casing 77 also has an opening 79 along the length of the clamp casing 77 on the bottom wall for transferring a screw into the elongated cylinder 71.

The clamp 82*b* has a leg portion 84*b* and a head portion 83*b* securely attached to one end of the leg portion 84*b*. The leg portion 84*b* is made of a rigid but flexible material, such as plastic or steel, and is secured to the clamp receptor 74 with suitable fasteners. The head portion 83*b* has a concave surface for holding the head of a screw. To firmly hold a screw, the head portion 83*b* is preferably made with a magnetized material. On the inner surface of the head portion 83*b*, there provide is an indent 85*b* which allows the clamp 82*b* to spread a part when the head portion of screw is pushed forward by screwdriver bit 130. In other words, when the screw head passes the indent 85*b* as the screw is pushed toward a work surface by a screwdriver bit, the indent 85*b* will allow the clamp 82*b* to effectively releasing the screw. The above description provided in connection with the clamp 82*b* is also applicable to the clamp 82*a* since both clamps have the identical shape and function.

Also illustrated in FIG. 4 is the chamber assembly 100 for loading a screw into the elongated cylinder 71 of the cylinder assembly 70. The chamber assembly 100 is removably disposed on the top of the clip 41 by a pair of oppositely positioned indents 104 (only one is shown in FIG. 3) of the chamber assembly 100 engaging the slits 55 formed on the opposite side of the clip 41 (shown in FIG. 2). The assembled casing 40 and chamber assembly 100 of the first embodiment of the present invention is shown in FIG. 3. The chamber assembly 100 has tracks 105 on the inner surface which are configured to receive matching rails 78 formed on the outer surface of the cylinder assembly 70. As a result, the cylinder assembly 70 is slidably mounted in the chamber assembly 100 with the opening 79 in communication with the clip 41 for transporting of screws into the cylinder assembly 70.

The chamber assembly 100 also has a C-shaped receptacle 102 for placing a matching spring 110. The receptacle 102 has a pair of extensions 109 formed on the opposite side of the receptacle 102 for holding apertures 112 in the spring 110. The spring 110 has a middle portion 114 for mounting a screw actuator 116 having a tip 118 and a base 119. The base 119 of the screw actuator 116 is inserted into the middle portion 114 of the spring 110 and is held in its place by placing a rubber band 122, or the like, across the protrusions 113 of the spring 110. Once the spring 110 is mounted on the receptacle 102, the tip 118 of the screw actuator 116 rests against a neck 106 formed in the chamber assembly 100.

FIG. 3 illustrates the placement of the spring 110 and the screw actuator 116.

Two substantially L-shaped clips 130 are each inserted into oppositely placed slots 108 formed in the receptacle 102. In particular, the head 132 portion of the clip 130 is inserted into the slot 108 for partially restricting the advancement of the screw, as shown in FIG. 3. The clips 130 may be securely mounted to the receptacle 102 with screw 133 or other suitable fasteners.

Figure 5A:
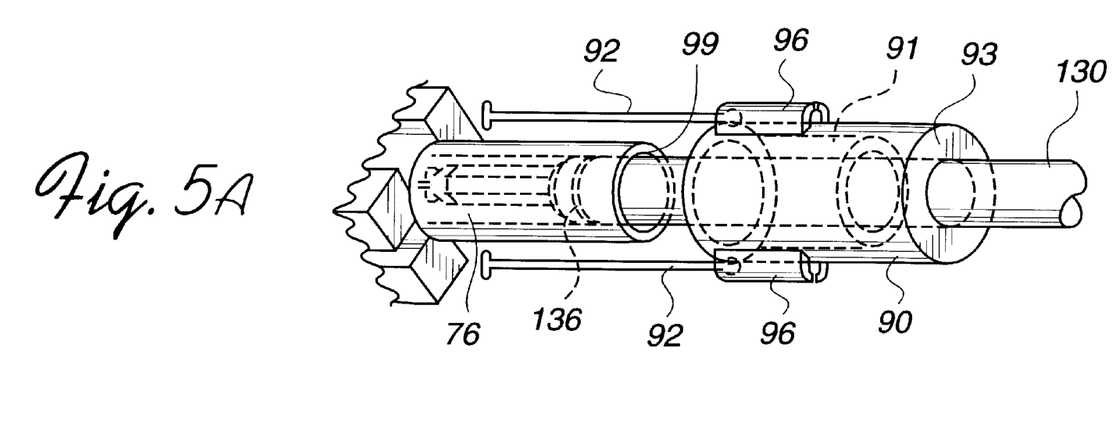
FIG. 5A illustrates the disassembled loading assembly shown in FIG. 1.
Figure 5B:
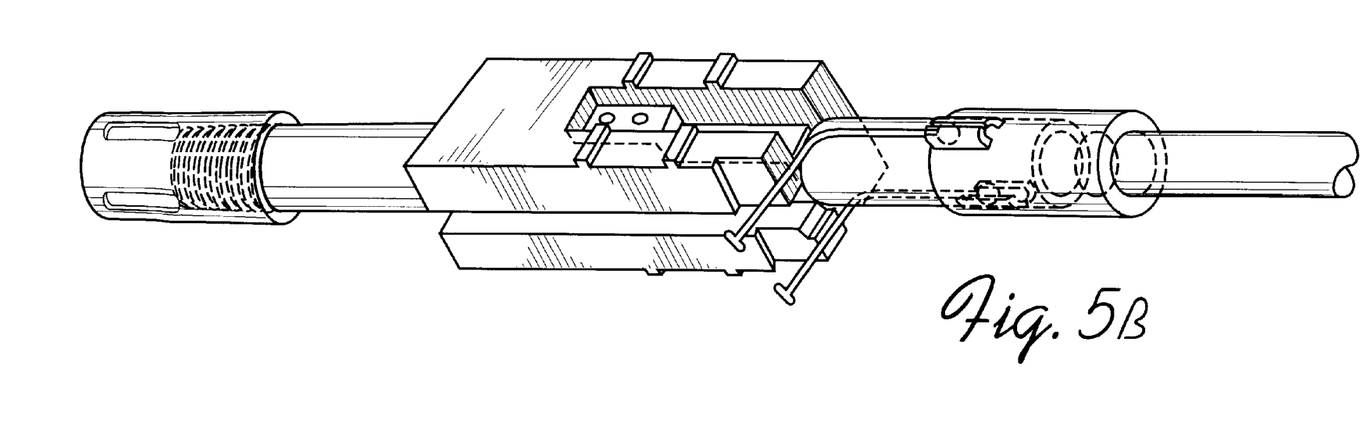
FIG. 5B illustrates the assembled loading assembly shown in FIG. 1.

In the first embodiment of the present invention, attached to the cylinder assembly 70 is a loading sleeve 90 as shown in FIG. 4. The loading sleeve 90, spring 110 and screw actuator 116 form a loading assembly for advancing and loading a screw into a chamber inside the elongated cylinder 71. As shown in FIGS. 5A and 5B, the loading sleeve 90 has a first cylindrical chamber 91 having a diameter slightly larger than the outer diameter of the second end 76 of the elongated cylinder 71. The loading sleeve 90 also has a second cylindrical chamber 93 in communication with the first chamber 91, which has a diameter sufficiently large to rotate and slide a screwdriver bit 130 through the opening, as shown in FIG. 5A. As a result, the loading sleeve 90 is slidably placed on the second end 76.

On the outer surface of the loading sleeve 90, there provided are two oppositely placed tubings 96 for mounting therein flexible but rigid strips 92. Each strip 92 preferably has a rounded end and a T-shaped opposite end. The rounded end is inserted and secured into the tubing 96, as shown in FIG. 5A. The T-shaped end is coupled to the protrusion 113 of the spring 110 through a path formed by cylindrical assembly 70 and the chamber assembly 100, as shown in FIG. 5B. Alternative to using the strips 92, other suitable connectors, such as wires, may be used.

Figure 6:
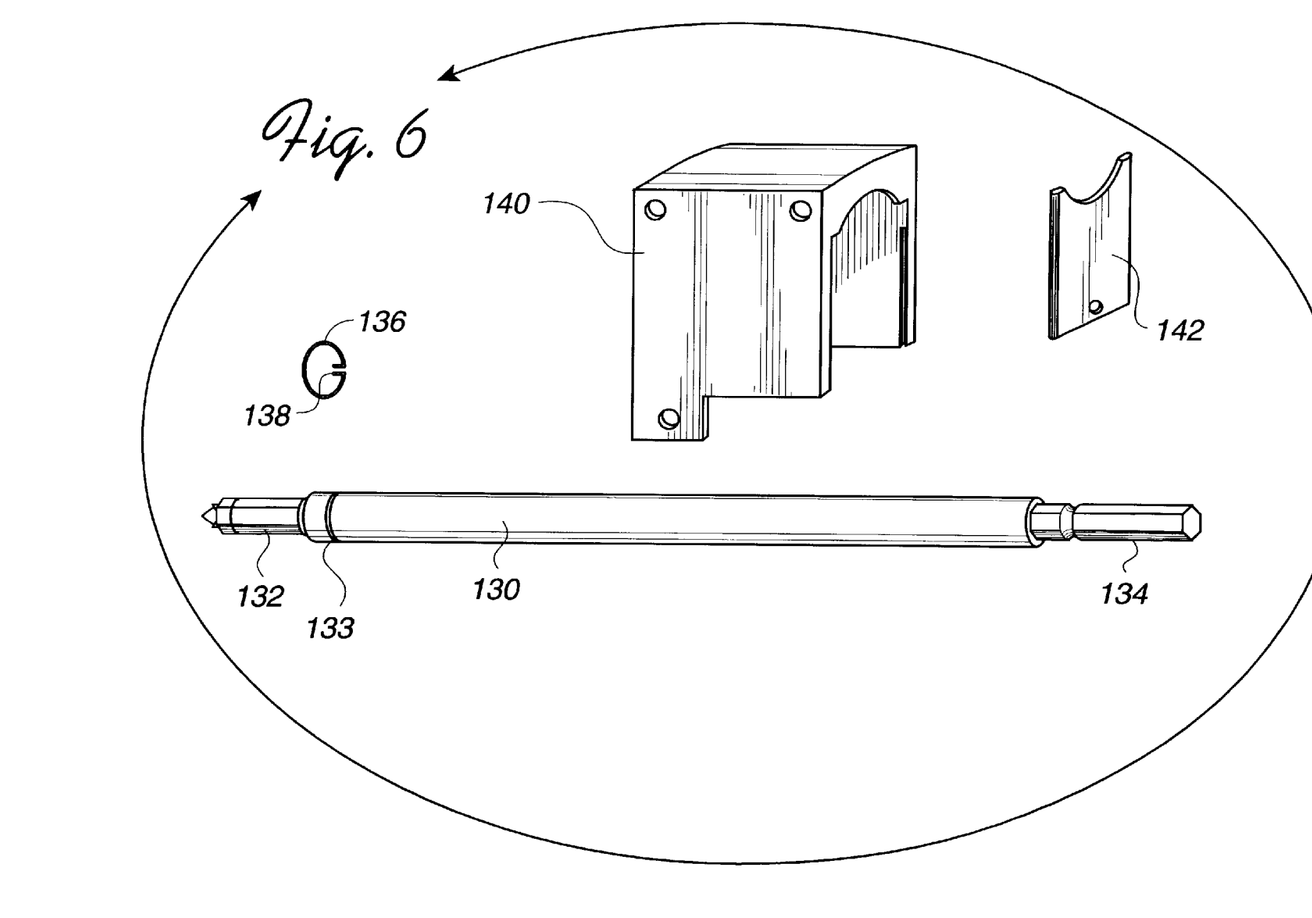
FIG. 6 illustrates a cover for the chamber assembly and a screwdriver bit for the first embodiment of the present invention.

FIG. 6 illustrates a top cover 140 and a front cover 142 for the chamber assembly 100. Also shown in FIG. 6 is a screwdriver bit 130 for use with the first embodiment of the present invention. The screwdriver bit 130 has an elongated body and a bit 132 which is removable. The elongated body is sufficiently long to extend through the length of the cylinder assembly 70. The bit 132 is held in place inside the elongated body by a ring 136 having an extension 138 which is inserted through an aperture 133 formed on one end of the screwdriver bit 130.

The operation of the screw feeding apparatus 10 according to the first embodiment is discussed below. To load screws into the clip 41, the clip cover 20 is placed near the bottom of the clip 41 by lowering the clip cover 20 while depressing the press region 25. Once the extension 26 of the engaging member 30 is placed in the lower receptor 42*b* of the clip 41, then the screws can be loaded, as shown in FIG. 3. Once fully loaded, the clip cover 20 is moved up so that the extension 26 of the engaging member 30 is placed in the upper receptor 42*a*. Because the coil 50 is coupled to the platform 60 which has been pushed away from the chamber assembly the biasing of the coil 50 allows the platform 60 to push the screws toward the chamber assembly 100.

To advance and load a screw into the cylinder assembly 70, and more particularly between the pair of clamps 82*a* and 82*b*, the loading sleeve 90 is pulled back (i.e., a loading position) with respect to the second end 76 of the elongated cylinder 71. The retracting movement of the loading sleeve 90 pushes upward the spring 110 which is coupled to the tubings 96 of the loading sleeve 90 with the pair of strips 92. The upward movement of the spring 110 forces the screw actuator 116 with its tip 118 engaging the head of a screw to move in the same direction, thus, advancing a screw queued in the clip 41 in the cylinder assembly 70, as shown in FIG. 3.

Once a screw is placed between the clamps 82a and 82b, the loading sleeve 90 is moved to its normal position due to an opposite bias created by the force of the spring 110. As a result, the screw actuator 116 returns to its normal position with the tip 118 disengaging the screw placed between the clamps 82a and 82b. The screw actuator 116 then engages an adjacent screw which is positioned immediately below the screw inside the cylinder assembly 70.

As shown in FIG. 5A, the inner cylindrical chamber 99 of the second end 76 of the cylinder assembly 70 has a diameter sufficiently large to slidably fit the screwdriver bit 130 having the ring 136. However, the diameter of the second cylindrical chamber 93 of the loading sleeve 90 is only large enough to slidably fit the screwdriver bit 130 without the ring 136. As a result, to load a screw into the cylinder assembly 70, the screwdriver bit 130 can be manually retracted, which in turn retracts the loading sleeve 90 away from the second end 76, because the ring 136 mounted on the screwdriver bit 130 engages the second cylindrical chamber 93.

Figure 7:
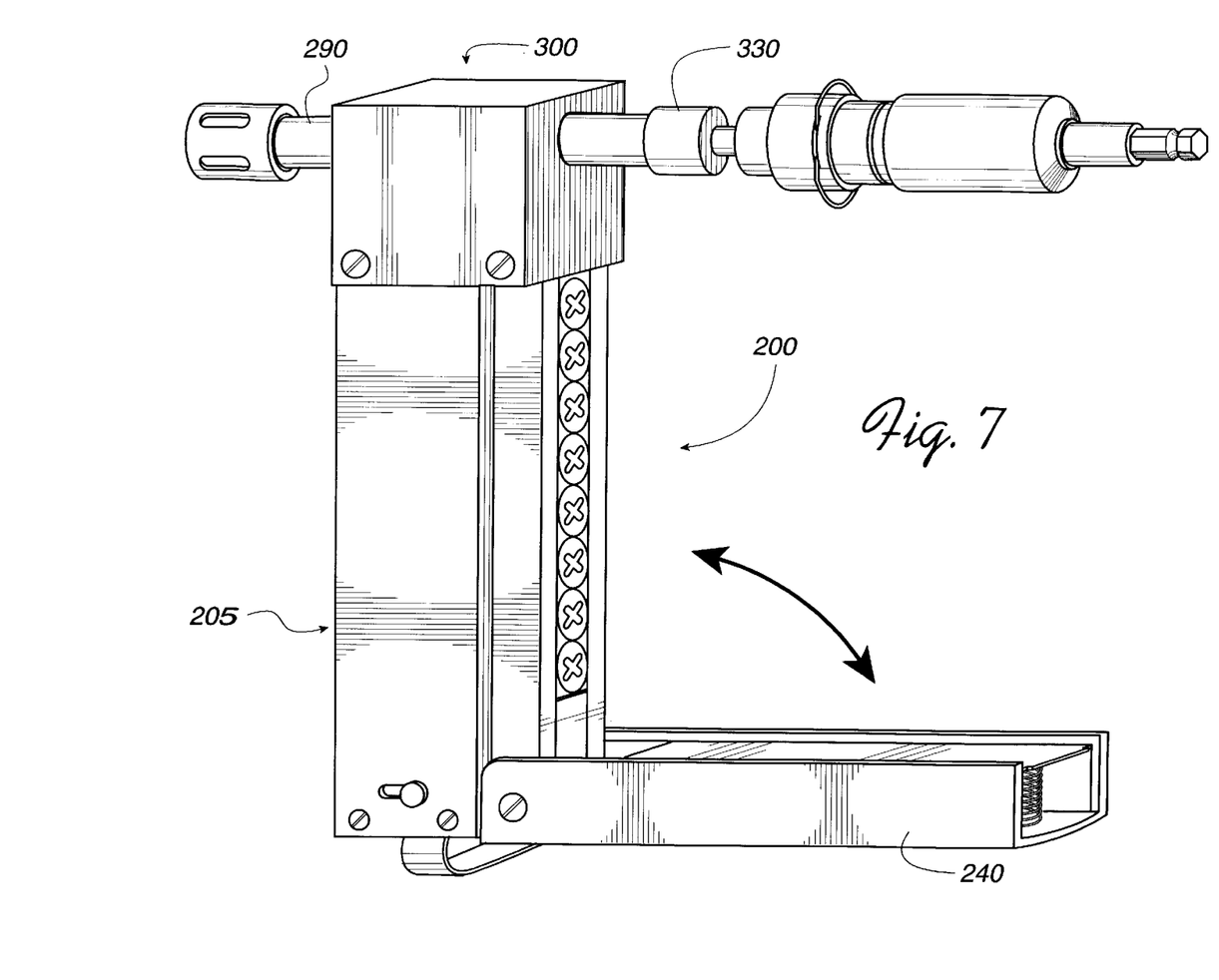
FIG. 7 is a perspective view of a second embodiment of the present invention.

FIGS. 7–13 illustrate a second embodiment of the screw feeding apparatus 300. In particular, FIG. 7 illustrates a perspective view of the screw feeding apparatus 200 which includes a casing 210 for holding screws, a chamber assembly 300 for releasably holding a screw in a cylinder assembly 290 and a loading sleeve 290 for loading a screw into the cylinder 270.

Figure 8:
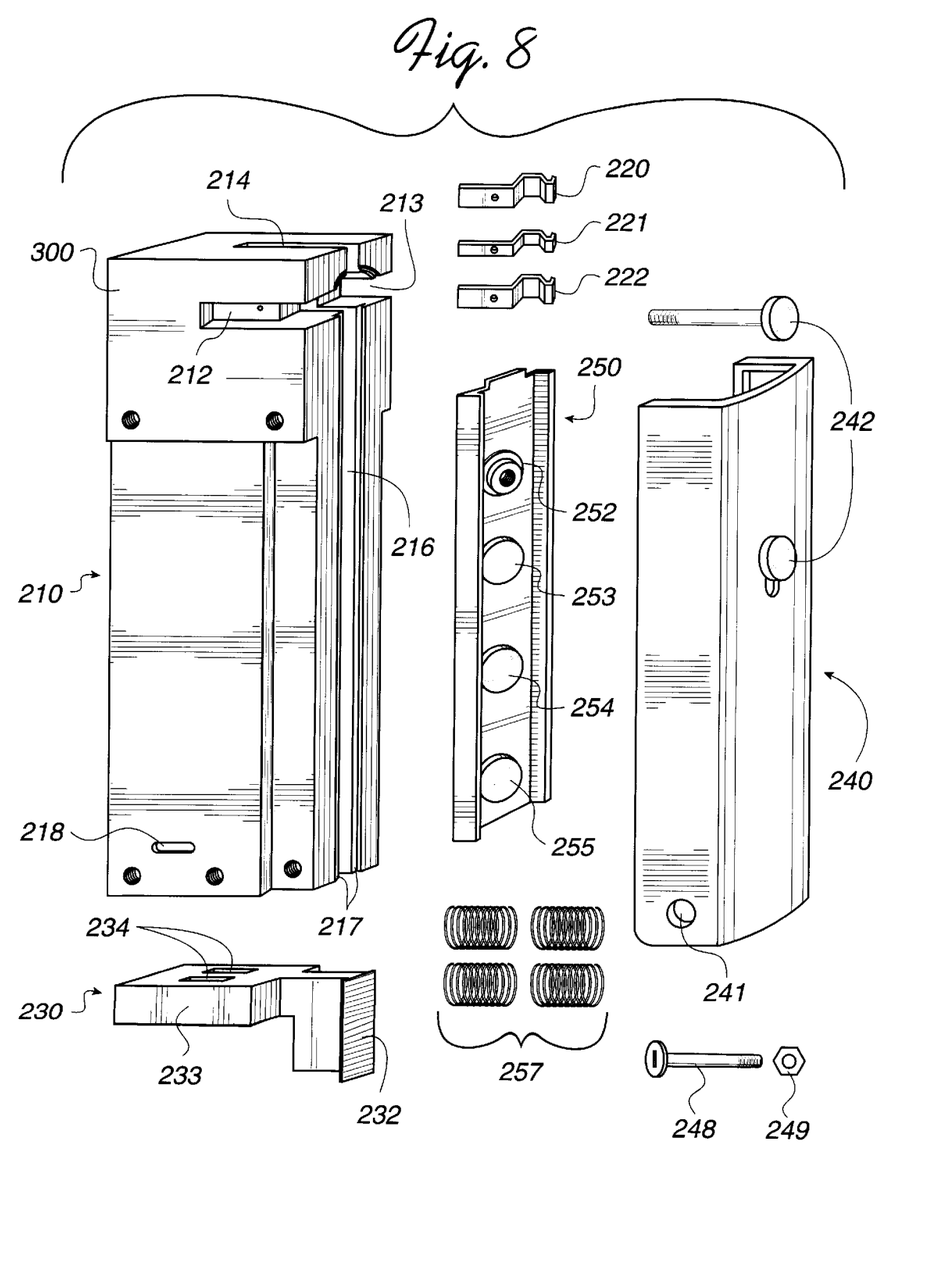
FIG. 8 is a partly exploded view of a casing of FIG. 7.

As shown in FIG. 8, the casing 205 includes a clip 210 which holds a stack of screws and a clip cover 240 which is pivotally attached to the clip 210 with a hinge comprising a screw 248 and a matching nut 249 inserted into a hole 241 formed on the lower end of the clip cover 240. The clip 210 has an elongated rectangular shape with a hollow chamber 216 extending along the length of the clip 41 for loading screws. A front side of the clip 210 is open so that the chamber 216 is exposed from the front. The front side of the clip 210 has a pair of rails 217 for guiding a platform 230.

Referring now to FIG. 8, the C-shaped clip cover 240 includes a partition 250 attached to the inner region of the clip cover 240 with a bolt 242 inserted through the clip cover 240 into a matching nut 252 mounted on the partition 250. It is preferable that before mounting the partition 250 to the clip cover 240, a set of four coils 257 be placed on the spring mounts 252–255. Preferably, the spring mount 252 may also used as the matching nut for the bolt 242. As a result, the properly mounted partition 250 rests against the screws loaded into the clip 210, as shown in FIG. 7. The pressure against the screws by the partition 250 may be controlled by using the springs 257 having a suitable coil tension.

Referring further to FIG. 8, the platform 230 has a support member 233 substantially perpendicularly attached to a shoulder 232. The support member 233 is slidably inserted into the clip 210 so that the shoulder 232 abuts against the rails 217. Under the platform 230, there is provided a spring 235 (shown in FIG. 11) biasing the platform 230 toward the chamber assembly 300. The structural arrangement of the platform 230 with regard to the base member 260 is better illustrated in FIG. 11.

Figure 9:
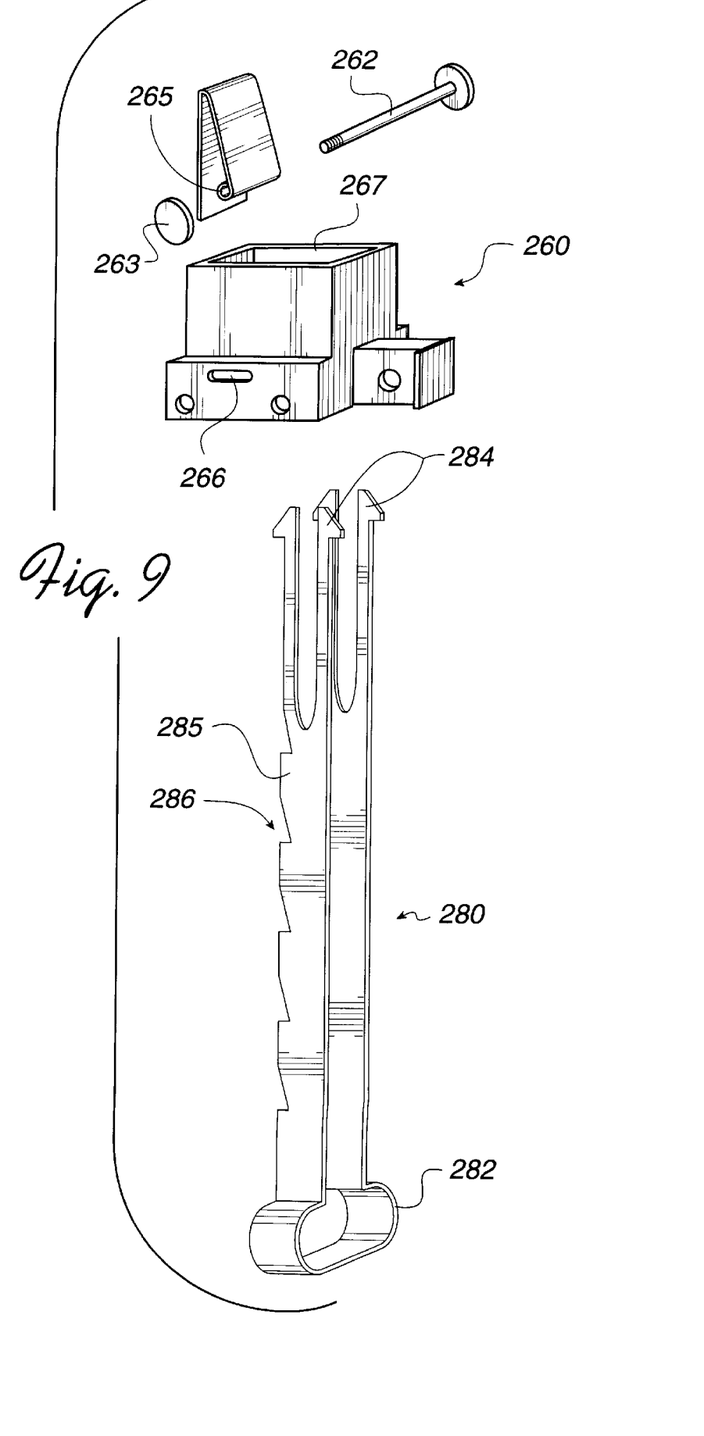
FIG. 9 illustrates fork and base member of the second embodiment shown in FIG. 7.

In FIG. 9, there is provided a base member 260 and a fork 280. The base member 260 is configured to securely mounted to the bottom portion of the clip 210 with fasteners or suitable adhesives. Once properly placed, a horizontal slit 266 in the base member 260 coincides with that of a matching slit 218 formed in the clip 210 (see FIG. 8). A V-shaped hook 264 having an opening 265 on one end is placed in the hollow interior of the base member 260, in which an elongated bolt 262 is inserted in the slit 266 from one side of the base member 260 through the opening 265 of the hook 264 and then through the slit 266 formed on the other side of the base member 260. A matching nut 263 is coupled to the elongated bolt 262. As a result, the hook 264 is held inside the base member 260 by the elongated bolt 262. The bolt 262 coupled to the hook 264 may be horizontally adjusted only limited by the shape of the slit 266.

Also shown in FIG. 9 is the fork 280 having an elongated body 285 sufficiently long to substantially extend the height of the clip 210. At one end of the fork 280, there is a rounded stopping member 282. The other end of the fork 280 has a pair of tips 284 for engaging the platform 230 through two vertical openings 234 (shown in FIG. 11). The elongated body 285 of the fork 280 has a multiple indents 286 for engaging the hook 264.

Figure 10:
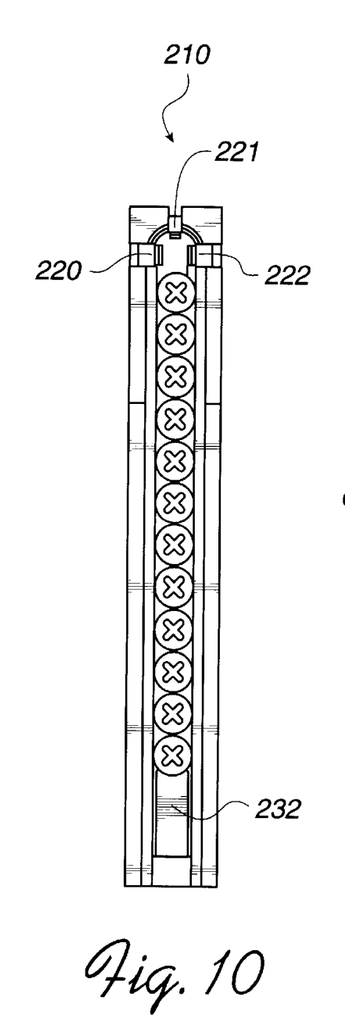
FIG. 10 is an elevated front view of the casing shown in FIG. 7.
Figure 11:
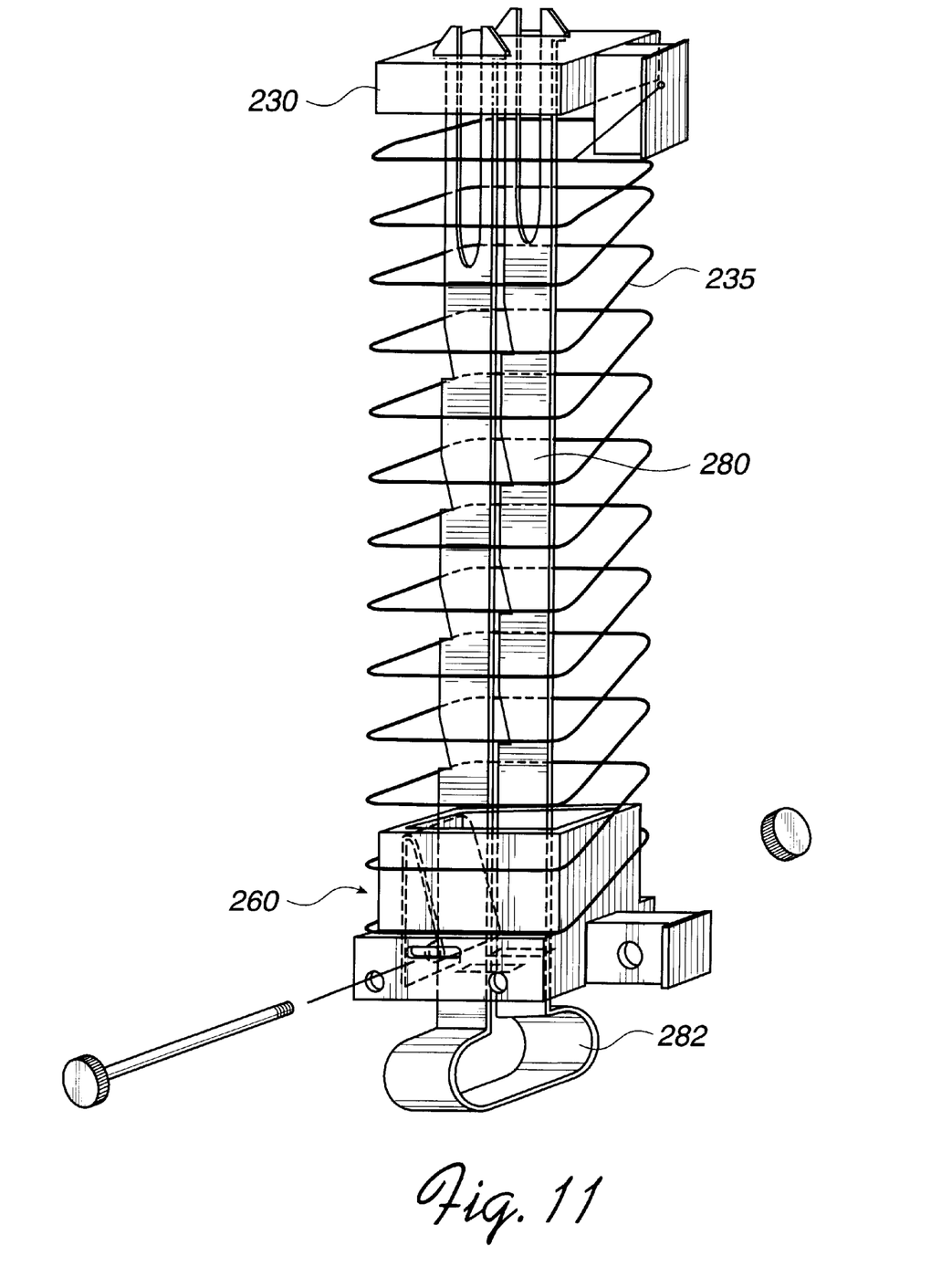
FIG. 11 illustrates assembled inner components of the second embodiment of the present invention.

The assembly of the casing will now be described in reference to FIG. 11. The assembled structure of the platform 230, spring 235, fork 280 and base 260, as shown in FIG. 11, is positioned in the clip 210 with the base member 260 secured to the clip 210. Once attached, the stopping member 282 of the fork 280 can be released from the clip 210 by sliding the elongated bolt 262 away from the clip cover 240 so that the hook 264 disengages the indent 286 of the fork 280. The lowering of the fork 280 from the clip 210 also lowers the platform 230, because the tip 284 of the fork 280 engages the platform 230, thus allowing an operator to load screws in the clip 210. When the fork 280 is disposed in the clip 210, the vertical position of the platform 230 changes in response to the amount of screws in the clip 210. For example, as the screws in the clip 210 are expended, the platform 230 will gradually move toward the chamber assembly. The front view of the clip 210 after loading the screws is illustrated in FIG. 10. Once the screws are loaded, the clip cover 240 can be closed.

In FIG. 8, attached to the clip 210 is a chamber assembly 300. In the preferred embodiment, the clip 210 and the chamber assembly 300 may be formed of a single integrated unit, instead of coupling two separate pieces. The chamber assembly 300 has two side grooves 212 (only one is shown in FIG. 8) and a top groove 214 which are configured to receive clamps 220–222. In particular, the wider clamps 220 and 222 are each securely fastened with suitable fasteners to the respective side groove 212 having wider width. The narrower clamp 221 is securely fastened to the top groove 214. Each of the clamps 220–222 has a bent end for holding the head of a screw. Once the clamps 220–222 are mounted, the three clamps are arranged to releasably hold a single screw, as shown in FIG. 10. The clamps 220–222 are preferably made with suitably rigid but flexible material, such as steel or plastic.

Figure 12:
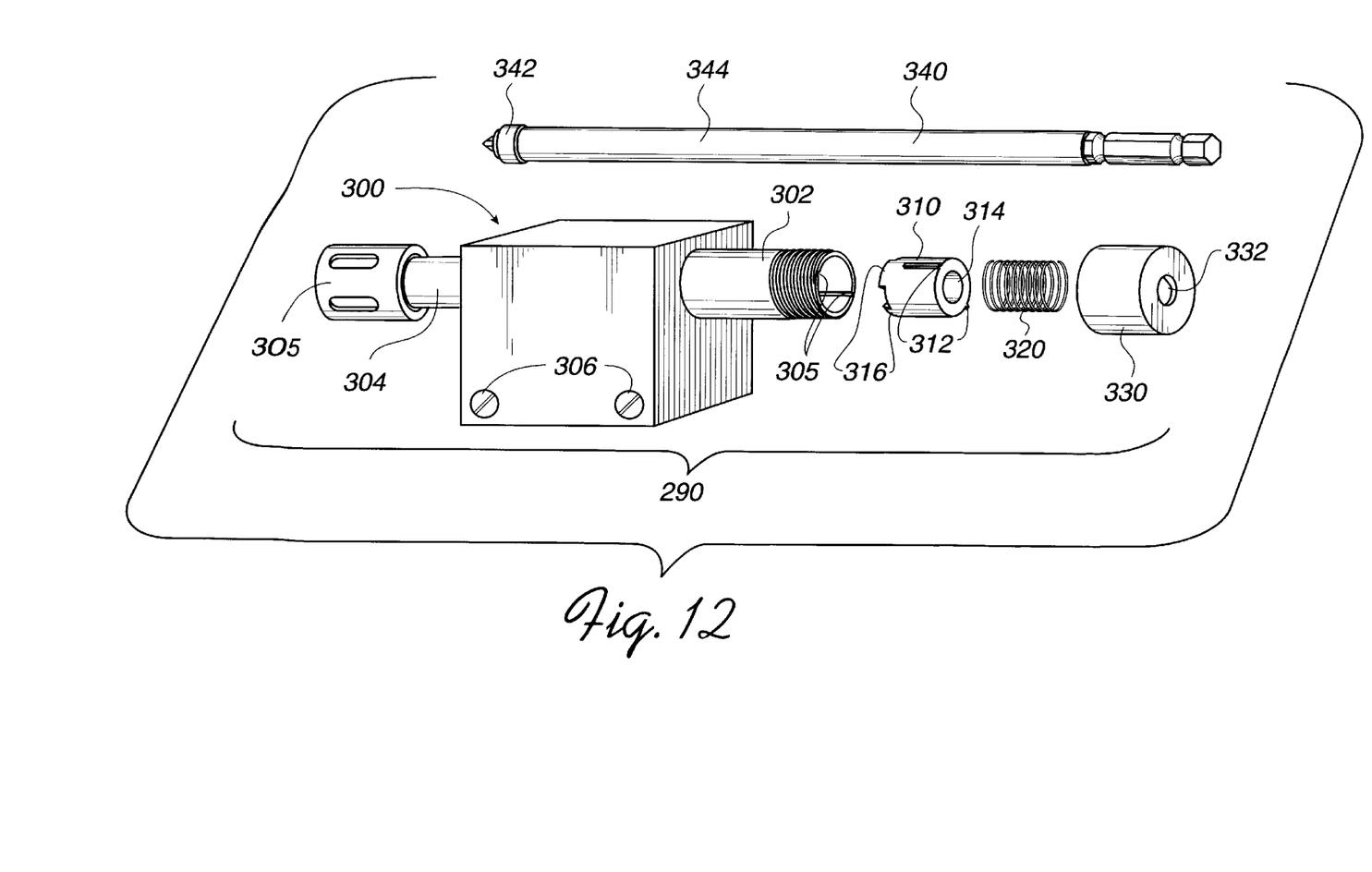
FIG. 12 is an exploded view of chamber assembly and cylinder assembly shown in FIG. 7.

Illustrated in FIG. 12 is the chamber assembly 300 and cylinder assembly 290. The chamber assembly 300 has a front opening for threadably mounting, or alternatively securing, a cylinder assembly 290 which include a front end cylinder 304 and a rear end cylinder 302. A first sleeve 305 has a matching inner thread (not shown) for adjustably securing onto the front end cylinder 304. The penetration depth of a screw can be controlled by adjusting the position of the first sleeve 305 with respect to the threaded front end cylinder 304.

The rear end cylinder 302 is mounted to the rear opening 213 (shown in FIG. 8) formed in the chamber assembly 300. Alternatively, the chamber assembly 300 may be formed as a single integrated piece having both front end 304 and rear end 302 cylinders. The rear end cylinder 302 has a threaded end for mounting an outer sleeve 330 having a matching inner thread. The rear end cylinder 302 also has oppositely situated inner tracks 305 formed in the inner longitudinal surface. The opening of the rear end cylinder 302 is sufficiently large to slide a loading sleeve 310 therein. The outer surface of the loading sleeve 310 has a pair of oppositely situated rails 312 for slidably engaging the matching inner tracks 305 of the rear end cylinder 302.

Figure 13:
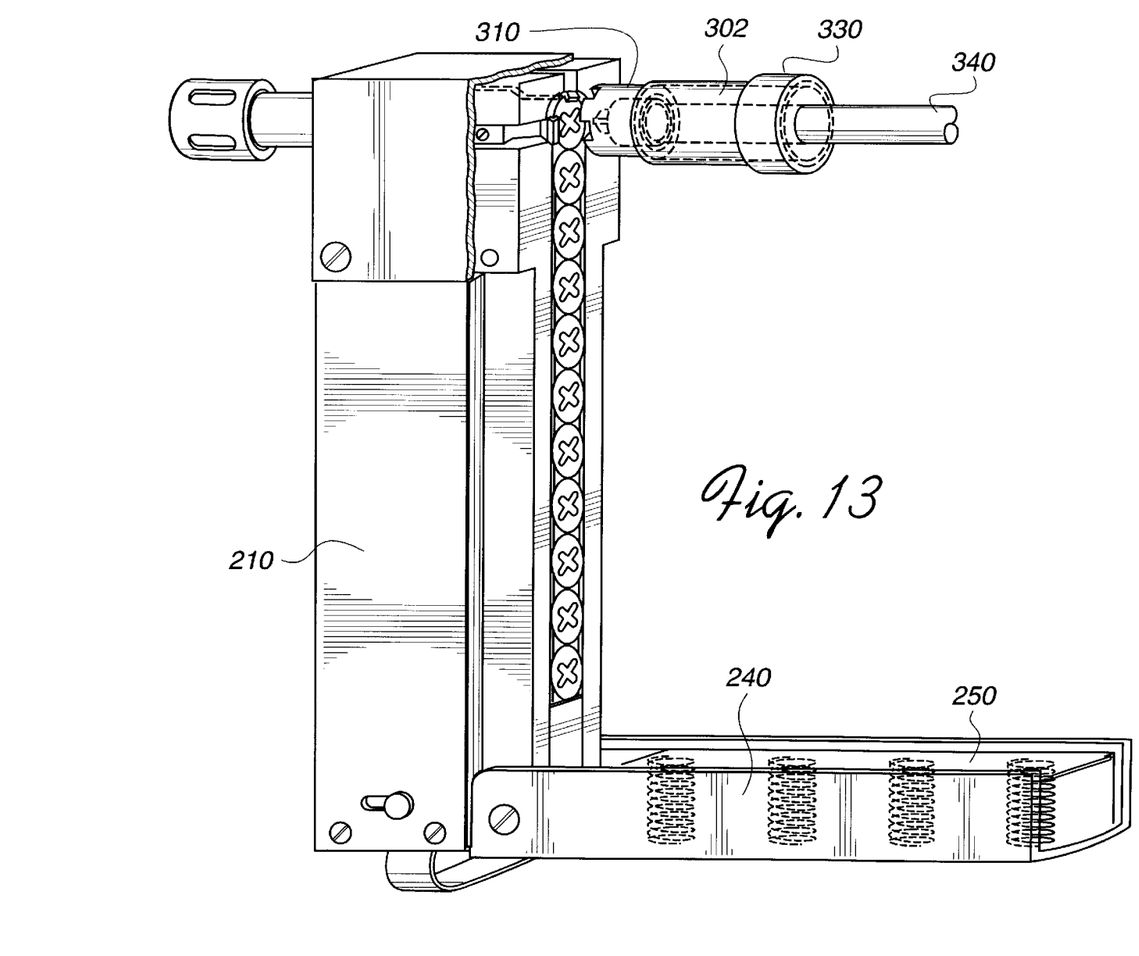
FIG. 13 illustrates a loading assembly of the second embodiment of the present invention.

The loading sleeve 310 has legs 316 extending from one end for inserting into the rear opening 213, adjacent to the spaces formed by the clamps 220–222, as shown in FIG. 13. As a result, when the loading sleeve 310 is fully inserted into the rear opening 213 of the chamber assembly 300, the screws loaded in the clip 210 cannot advance into the chamber because one of the legs 316 of the loading sleeve 310 is blocking the path into the chamber assembly 300. The loading sleeve 310 also has an aperture 314, the diameter of which is sufficiently large to accommodate the elongated body of a screwdriver bit 340. However, the aperture 314 preferably limits the movement of the neck 342 of the screwdriver bit 340, since the neck 342 has a larger diameter than the elongated body of the screwdriver bit 340. Once the screwdriver bit 340 and the loading sleeve 310 are inserted into the rear end cylinder 302, a spring 320 is placed between the loading sleeve 310 and the outer sleeve 330 to bias the loading sleeve 310 toward the opening 213 of the chamber assembly 300.

The operation of the screw feeding apparatus according to the second embodiment is discussed below in reference to FIG. 13. To load screws into the clip 210, the clip cover 240 is pivotally opened in a 90-degree position with respect to the clip 210. The screws are then loaded, as shown in FIG. 13. Once fully loaded, the clip cover 240 is closed with the partition 250 pressing against the heads of the screws.

To load a screw into the cylinder assembly 290, and more particularly between the clamps 220–222, the loading sleeve 310 is retracted (i.e., a loading position) with respect to the rear end cylinder 302 of the cylinder assembly 290. The backward movement of the loading sleeve 310 is achieved by pulling the screwdriver bit 340 since the neck 342 of the screwdriver 340 is larger than the aperture 314 of the loading sleeve 310. As the loading sleeve 310 is pulled back from the opening 213, the platform 230 biased by the spring 235 advances a screw between the clamps 220–222. Once a screw is placed between the clamps 220–222, the loading sleeve 310 is moved to its normal position due to an opposite bias created by the force of the spring 320 disposed between the loading sleeve 310 and the outer sleeve 330. Hence, the legs 316 of the loading sleeve 310 prevent the adjacent screw from advancing into the clamps 220–222.

When a force from the screwdriver bit 340 is applied to the screw place among the clamps 220–222, the clamps 220–222 gradually open up, thus releasing the head of the screw. Once released, the screw travels through the opening defined by the cylinder assembly and is driven into a work surface. To load the next screw from the clip 210, the above loading steps are repeated.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A screw feeding apparatus operable with a screwdriver bit, the screw feeding apparatus comprising:
   a casing for holding screws;
   a platform slidably disposed in the casing for supporting and advancing the screws;
   a chamber assembly secured to the casing, in which the chamber assembly includes an elongated cylinder assembly for guiding a screw from the chamber assembly to a work surface when the screwdriver bit disposed in the cylinder assembly engages the screw;
   a coil coupled to the platform for biasing the platform toward the chamber assembly to advance the screws into the chamber assembly;
   a clamp assembly mounted to the chamber assembly for releasably holding the screw; and
   a loading sleeve slidably coupled to the elongated cylinder to maintain at least one of first and second positions with respect to the elongated cylinder, wherein a screw from the casing is loaded in the chamber assembly when the loading sleeve is in the second position, wherein the clamp assembly includes an actuator actuated in an advancing direction of the screws in the case by the loading sleeve, the actuator engaging a head portion of the screw to advance the screw in the cylinder assembly in response to the movement of the loading sleeve.

2. A screw feeding apparatus of claim 1, wherein the screwdriver bit engages the loading sleeve so that the retracting of the screwdriver bit from the chamber assembly retracts the loading sleeve to maintain the second position for loading a screw into the chamber assembly.

3. A screw feeding apparatus of claim 1, the elongated cylinder assembly including a front cylinder secured to a front of the chamber assembly and a rear cylinder secured to a rear of the chamber assembly, the front and rear cylinders aligned so as to allow the screwdriver bit to drive a screw from the chamber assembly to the work surface.

4. A screw feeding apparatus operable with a screwdriver bit, the screw feeding apparatus comprising:
   a casing for holding screws;
   a platform slidably disposed in the casing for supporting the screws;
   a chamber assembly removably coupled to the casing,
   a cylinder assembly mounted to the chamber assembly, the cylinder assembly having first and second cylinders, the cylinder assembly guiding a screw from the casing to a work surface when the screwdriver bit disposed in the cylinder assembly engages the screw;
   a coil coupled to the platform for biasing the platform toward the chamber assembly to advance the screws from the casing into the cylinder assembly;
   clamps fastened to the chamber assembly for releasably holding the screw; and
   a loading sleeve disposed in surrounding relation to the screwdriver bit and slidably coupled to the elongated cylinder to maintain at least one of first and second positions with respect to the elongated cylinder, wherein a screw from the casing is loaded in the cylinder assembly when the loading sleeve is in the second position, wherein the clamps engage the screw in response to the movement of the loading sleeve, wherein the screw from the casing is loaded in the cylinder assembly when the loading sleeve is in the second position along the same axis as the screwdriver bit and is prevented from being loaded in the cylinder assembly when the loading sleeve is in the first position.

5. A screw feeding apparatus of claim 4, wherein the casing comprises a clip and a clip cover slidably coupled to the clip so that when the clip cover slides open, an internal chamber of the clip is exposed for loading screws.

6. A screw feeding apparatus of claim 4, wherein each one of the clamps has a magnetized end for holding the screw.

7. A screw feeding apparatus of claim 4, further comprising a spring and a screw actuator coupled to the spring mounted on the chamber assembly, the screw actuator engaging the head of the screw, wherein the spring is coupled to the loading sleeve for advancing the screw in respond to the movement of the loading sleeve with respect to the second cylinder of the cylinder assembly.

8. A screw feeding apparatus of claim 7, wherein the loading sleeve is coupled to the spring with a strip, the strip having first and second ends, the first end coupled to the loading sleeve and the second end coupled to the spring so that when the loading sleeve is in the second position with respect to the second cylinder a screw is advanced into the cylinder assembly.

9. A screw feeding apparatus of claim 4, further comprising a pair of limiting clips secured to the chamber assembly for partially limiting the advancement of a screw into the chamber assembly.

10. A screw feeding apparatus of claim 4, wherein a first end of the coil is secured to a lower end of the clip and a second end of the coil is coupled to the platform through rollers rotatably mounted on the upper end of the clip.

11. A screw feeding apparatus of claim 4, wherein the screwdriver bit has an enlarged first end which is larger in diameter than an opening defined by the loading sleeve, so that when the screwdriver bit is pulled away from the chamber assembly, the enlarged first end of the screwdriver bit engages the loading sleeve to actuate the spring and the screw actuator to advance a screw held by the screw actuator.

12. A screw feeding apparatus of claim 1, wherein the casing comprises a clip and a clip cover slidably coupled to the clip so that when the clip cover slides open, an internal chamber of the clip is exposed for loading screws.

13. A screw feeding apparatus of claim 1, wherein the clamp assembly further includes clamps which have magnetized portions for holding the screw.

14. A screw feeding apparatus of claim 1, wherein the clamp assembly has a spring mounted on the chamber assembly, the actuator being coupled to the spring and the screw actuator engaging the head of the screw, wherein the spring is coupled to the loading sleeve for advancing the screw in respond to the movement of the loading sleeve with respect to the second cylinder of the cylinder assembly.

15. A screw feeding apparatus of claim 14, wherein the loading sleeve is coupled to the spring with a strip, the strip having first and second ends, the first end coupled to the loading sleeve and the second end coupled to the spring so that when the loading sleeve is in the second position with respect to the second cylinder a screw is advanced into the cylinder assembly.

16. A screw feeding apparatus of claim 1, further comprising a pair of limiting clips secured to the chamber assembly for partially limiting the advancement of a screw into the chamber assembly.

17. A screw feeding apparatus of claim 1, wherein a first end of the coil is secured to a lower end of the clip and a second end of the coil is coupled to the platform through rollers rotatably mounted on the upper end of the clip.

18. A screw feeding apparatus of claim 1, wherein the screwdriver bit has an enlarged first end which is larger in diameter than an opening defined by the loading sleeve, so that when the screwdriver bit is pulled away from the chamber assembly, the enlarged first end of the screwdriver bit engages the loading sleeve to actuate the spring and the screw actuator to advance a screw held by the screw actuator.

* * * * *